United States Patent [19]

Lemelson

[11] Patent Number: 4,636,137

[45] Date of Patent: Jan. 13, 1987

[54] TOOL AND MATERIAL MANIPULATION APPARATUS AND METHOD

[76] Inventor: Jerome H. Lemelson, 48 Parkside Dr., Princeton, N.J. 08540

[21] Appl. No.: 638,432

[22] Filed: Aug. 6, 1984

Related U.S. Application Data

[63] Continuation of Ser. No. 200,347, Oct. 24, 1980, abandoned, which is a continuation of Ser. No. 910,998, May 30, 1978, abandoned, which is a continuation of Ser. No. 753,321, Dec. 20, 1976, abandoned, which is a continuation of Ser. No. 544,832, Jan. 28, 1975, abandoned, which is a continuation-in-part of Ser. No. 436,073, Jan. 24, 1974, abandoned.

[51] Int. Cl.$^4$ .............................................. B25J 9/00
[52] U.S. Cl. ........................................ 414/730; 901/1; 901/46
[58] Field of Search ............... 414/626, 730, 591, 744, 414/751–753, 786; 318/568; 343/225; 337/37; 358/93, 100, 101; 364/107, 117, 478, 513; 325/37; 187/1 R; 294/64 R; 901/1, 46

[56] References Cited

U.S. PATENT DOCUMENTS

| Re. 26,904 | 6/1970 | Lemelson | 414/730 |
|---|---|---|---|
| 2,602,524 | 7/1952 | Shirley | 187/1 R |
| 2,696,565 | 12/1954 | Shockley | 414/1 X |
| 2,861,699 | 11/1958 | Youmans | 414/786 |
| 3,043,448 | 7/1962 | Melton | 414/4 |
| 3,165,899 | 1/1965 | Shatto | 294/64 R |
| 3,381,485 | 5/1968 | Crooks | 414/626 X |
| 3,454,169 | 7/1969 | Bridges | 414/735 |
| 3,709,379 | 1/1973 | Kaufeldt | 414/591 |
| 3,819,061 | 6/1974 | Andersson | 414/591 |
| 3,851,769 | 12/1974 | Noguchi | 414/744 R |
| 3,854,889 | 12/1974 | Lemelson | 414/751 X |
| 4,046,262 | 9/1977 | Vykukal et al. | 901/1 X |

FOREIGN PATENT DOCUMENTS 929352 6/1963 United Kingdom .................. 414/4

Primary Examiner—Terrance L. Siemens
Attorney, Agent, or Firm—Neil F. Markva

[57] ABSTRACT

A manipulator has a carriage adapted for free travel movement along a surface and a reversible first motor for driving the carriage. An upstanding support is mounted on the carriage and a manipulation arm assembly is supported for movement on the upstanding support. A reversible second motor drives the arm assembly on the upstanding support. An operating head includes a tool supported at the end of the manipulation arm assembly. A remote control mechanism operates the first and second motors and the operating head at a remote location. A first television camera is supported at the upper end of the upstanding support and adapted to scan a first image field in front of the manipulator. A second camera is supported by the manipulation arm assembly and adapted to scan a second image field including the operating head and an article to be operated on by the operating head. Video signals are transmitted by a transmitting mechanism and received to display picture information defined by the first and second image fields scanned by the first and second television cameras to permit a person operating the remote control mechanism at the remote location to view an area immediately in front of the manipulator, the operating head and an area immediately in front of the operating head. Another feature is directed to a cycle initiating circuit for initiating operation of a program control circuit to cause it to generate command control signals which operate a plurality of motors causing various movements in an article manipulation apparatus. A wireless signal transmitter and wireless receiver circuitry operate with short wave command control signals to effectuate remote control of the manipulation apparatus.

46 Claims, 8 Drawing Figures

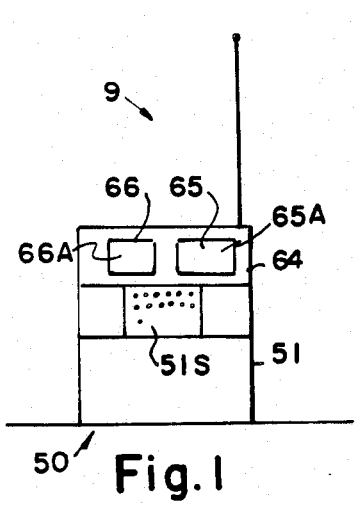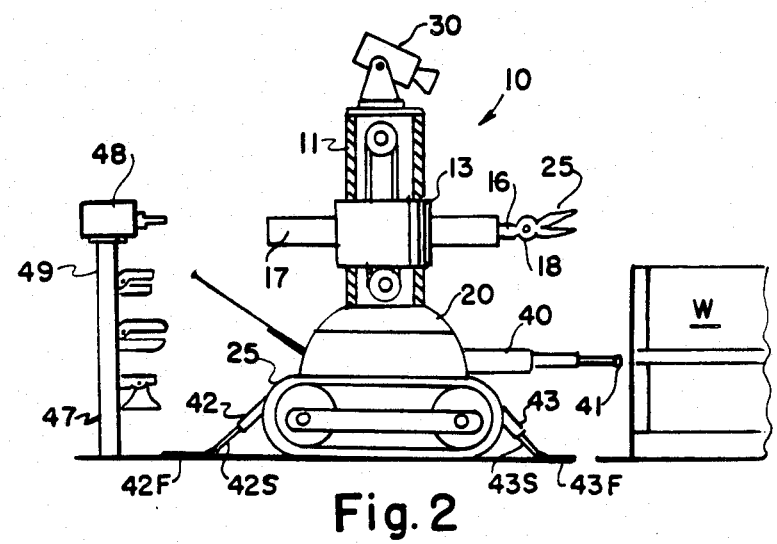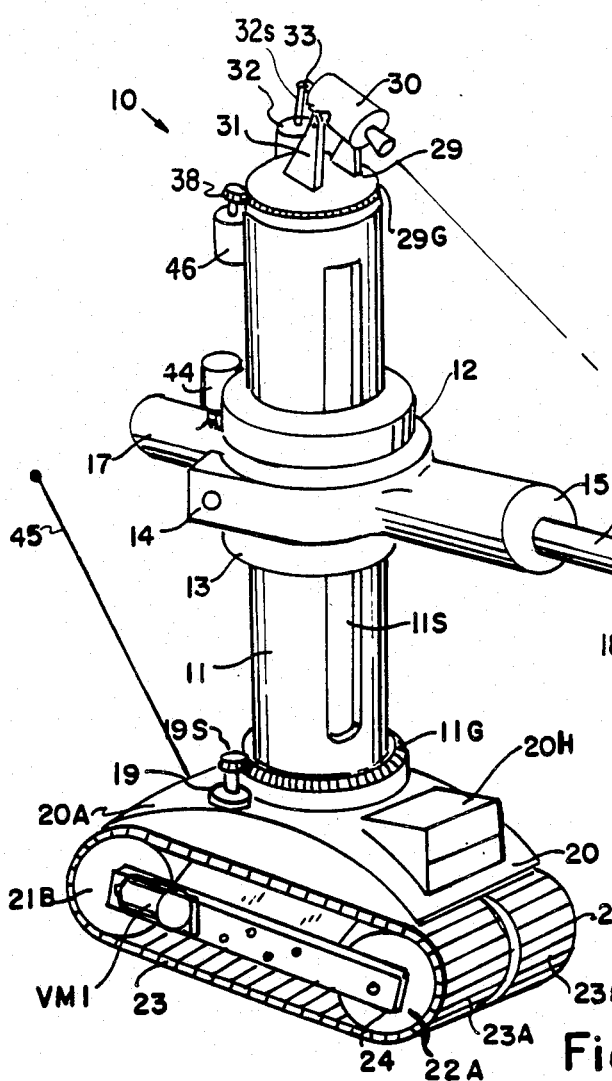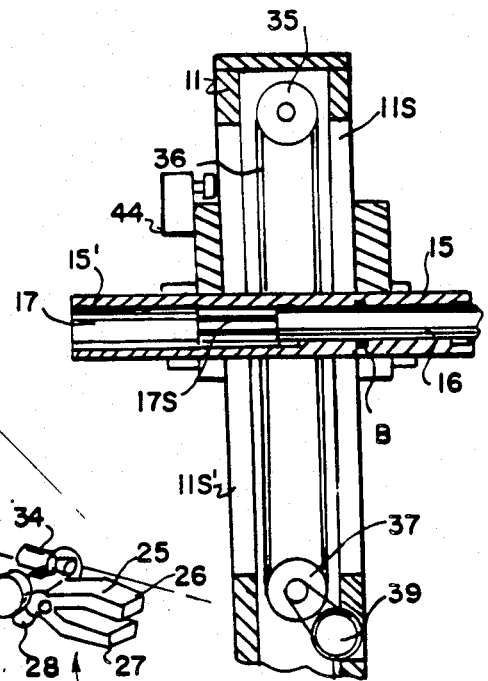
Fig. 1
Fig. 2
Fig. 3
Fig. 4

TOOL AND MATERIAL MANIPULATION APPARATUS AND METHOD

RELATED APPLICATIONS

This is a continuation of application Ser. No. 200,347, filed Oct. 24, 1980, now abandoned; which is a continuation of application Ser. No. 910,998, filed May, 30, 1978, now abandoned; which is a continuation of application Ser. No. 753,321, filed Dec. 20, 1976, now abandoned; which is a continuation of application Ser. No. 544,832, filed Jan. 28, 1975, now abandoned; which is a continuation-in-part of application Ser. No. 436,073, filed Jan. 24, 1974, now abandoned.

SUMMARY OF THE INVENTION

This invention relates to article manipulation and transfer apparatus and system for automatically controlling one or more manipulators to perform both preprogrammed operations on work-in-process and operations under remote control effected by wire or wireless communication between a remote control station and the one or more manipulators. The remote form of control of the manipulator may be provided to preposition the manipulator with respect to a machine or conveyor prior to initiating a cycle of automatic control thereof or to remotely control the manipulator to perform an article handling function per se or for the purpose of generating command control signals for automatically controlling the manipulator thereafter in one or more automatic cycles.

The conventional program controlled article manipulator is operative to perform a transfer cycle wherein the components of the manipulator are controlled by a programmer or limit switch means to pick-up, predeterminately move and deposit an article in a fixed cycle. Performance is thus predetermined with respect to transferring articles to or from a fixed machine or conveyor. However, such a fixed means for controlling the manipulator limits the operation of the manipulator to perform a particular transfer function over and over again. The control system so used cannot be applied to operations wherein conditions may vary from time to time such as situations where the size and shape of the work or article being handled may vary from time to time, or the machine, conveyor or temporary storage device for the article being handled may move or the manipulator may have to shift and/or vary its operation from time to time. Also, in situations where it may be desired to have one manipulator service a number of machines in no particular timed sequence, the aforementioned conventional means for controlling the manipulator may not suffice to permit proper operation of the manipulator.

Accordingly, it is a primary object of this invention to provide a new and improved apparatus and method for handling articles in a variety of transfer and production functions.

Another object is to provide a new and improved material handling system capable of performing article manipulation operations under a variety of conditions.

Another object is to provide an article manipulation apparatus having a multi-function control system for an article manipulator capable of controlling the manipulator in a programmed manner and under the remote control of an operator or a remotely located computer so as to permit the operator or computer to preposition the manipulator with respect to an article, machine, conveyor or other device prior to initiating a preprogrammed operation thereon.

Another object is to provide a control system for remotely and automatically controlling a plurality of article manipulation devices to perform a variety of handling functions which may vary from time to time wherein the control cycle of one or more manipulators in the system may vary with time.

Another object is to provide a system for remotely manually and automatically controlling a series of machines such as article manipulators, machine tools, earth moving machines, building construction machines and the like.

Another object is to provide a system and method for controlling a machine to perform one or more preprogrammed operations with respect to work wherein the relative position of the work and the machine may vary from time to time and wherein means are provided to account for such variation between the location of the machine and the work.

Another object is to provide a control system for machinery wherein a programming means for a machine may be altered or added to by remotely controlling the machine and recording signals indicative of machine operation under such remote control which signals may be repeatedly reproduced thereafter to automatically control the machine.

Another object is to provide a system for controlling a machine where remote control is effected with the aid of television to preposition and align one or more machine components and wherein remote control is effected both of one or more television cameras and one or more machine components.

Another object is to provide an article transfer apparatus having one or more article manipulators servicing one or more conveying and/or machines wherein both remote and automatic control may be effected of the manipulator, conveyor and, in certain instances, the machine itself so as to properly condition all units for automatic operation.

Another object is to provide an automatic, self propelled automatic manipulator for tools or work with variable support means for the manipulator and means for automatically bringing said support means into operation during all or part of a control cycle under program control or control effected by sensing an unbalancing force caused by lifting an article or the action of a tool supported by the manipulator.

Another object is to provide a control system for automatic, remote controlled manipulators which system includes means for remotely and, in certain instances, automatically controlling television cameras associated with the operation of the manipulator for facilitating or effecting remote control of the manipulator.

Another object is to provide a remote control system for a tool or article manipulator which system employs a plurality of television cameras which are operable for simultaneously scanning the manipulator and its tool head or article seizing head from a plurality of attitudes providing both a close up and more remote picture of the manipulator and its environment so as to permit a person to monitor and suitably control the operation of the manipulator and its seizing head or tool.

Another object is to provide an article or tool holding manipulator which may automatically change its own tools or article seizing heads to perform different operations with respect to handling and operating on work or in the event of tool wear or head malfunction.

Another object is to provide a control system associated with an article manipulator including means for sensing different articles to be seized by the manipulator and means responsive to the signals generated by such sensing for controlling the operation of the manipulator to change its working head or the adjustment thereof to permit it to work on the article or work sensed.

BRIEF DESCRIPTION OF THE DRAWINGS

With the above and such other objects in view as may hereinafter more fully appear, the invention consists of the novel constructions, combinations and arrangements of parts as will be more fully described and illustrated in the accompanying drawings but it is to be understood that changes, variations and modifications may be resorted to which fall within the scope of the invention as claimed.

In the drawings:

FIG. 1 is a side view of a monitor station which includes television monitor means and radio signal generating means for generating command control signals for remotely controlling machinery such as the manipulation apparatus shown in FIGS. 2 and 3;

FIG. 2 is a side view of a self propelled manipulator and a tool rack associated therewith;

FIG. 3 is an isometric view of the manipulator of FIG. 2;

FIG. 4 is a side view with parts broken away for clarity of part of the apparatus of FIG. 3;

DETAILED DESCRIPTION

Figure 5:
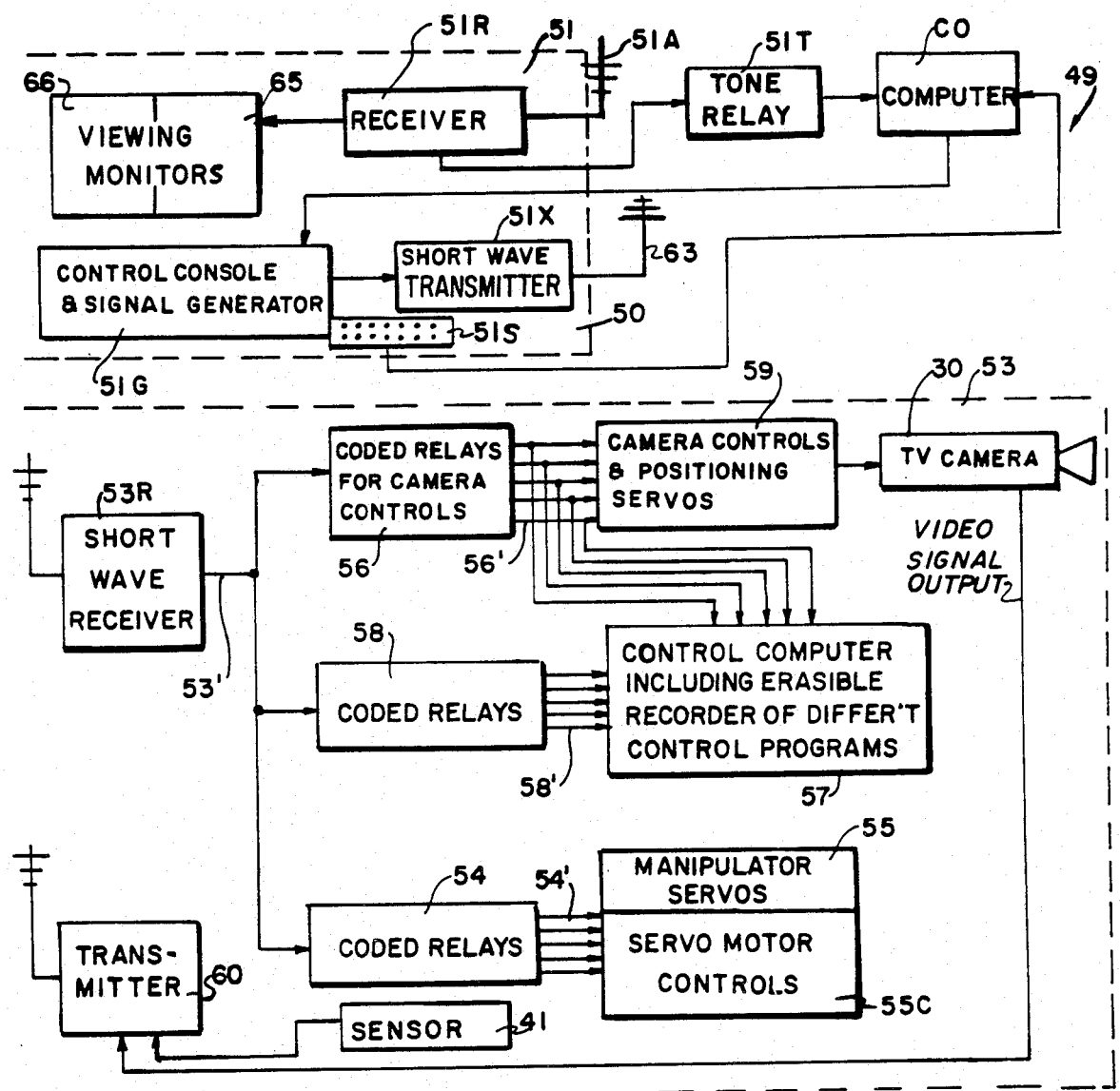
FIG. 5 is a master control diagram of a system for automatically and remotely controlling a manipulator of the type shown in FIGS. 1-4.
Figure 7:
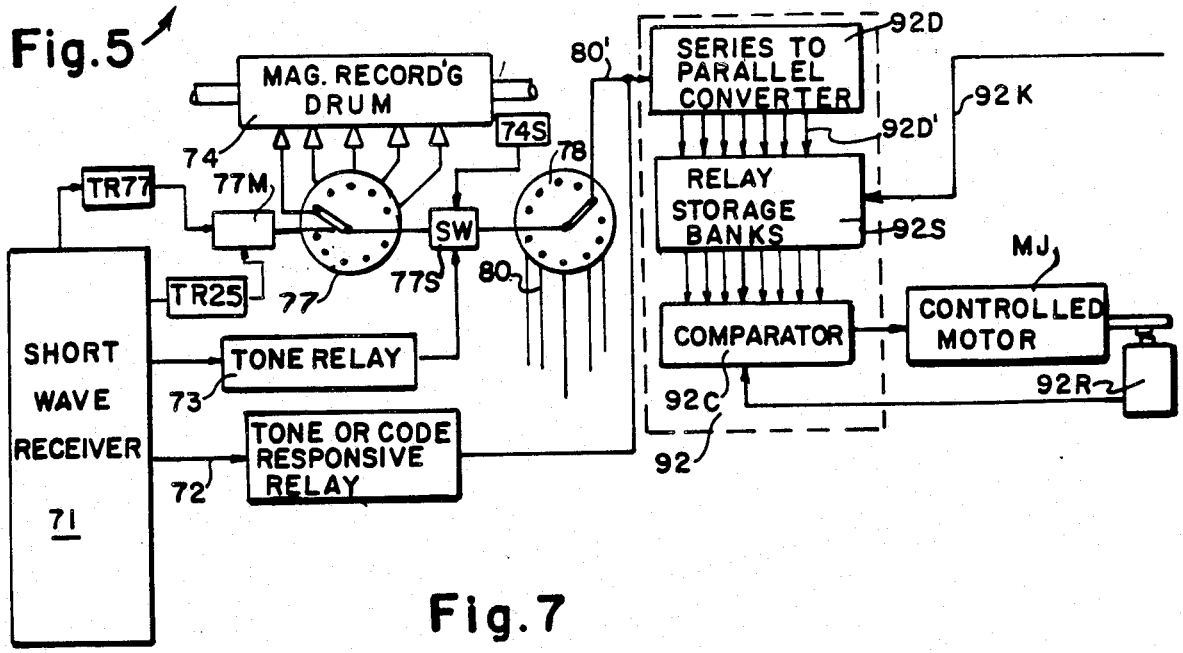
FIG. 7 shows additional details of an automatic control system for an automatic manipulator of the type shown in FIGS. 1-4.
Figure 6:
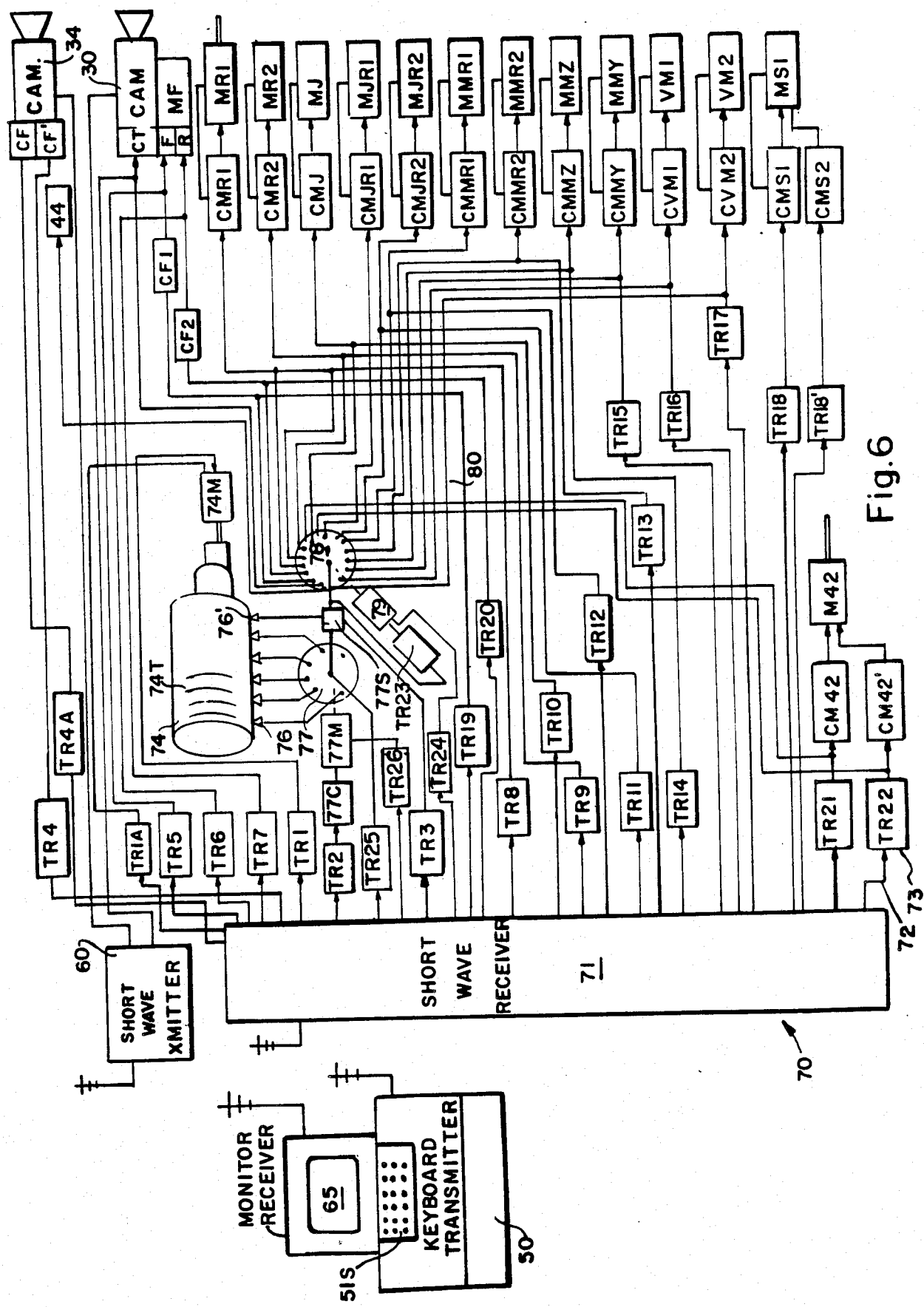
FIG. 6 is a control diagram showing further details of an automatic control system for a manipulator of the type shown in FIGS. 1-4.

The control diagrams provided herein, particularly those illustrated in FIGS. 5 to 7 are drawn in block diagram form in order to simplify the drawings, particularly where a component or subsystem is known in the art. To further simplify the drawings, where not illustrated, the correct sources of electrical energy or power supplies are assumed to be provided on the correct sides of all switches, motors, solenoids, relays, amplifiers, receivers transmitters, television cameras, controls and others of the components provided in the diagrams.

The instant invention is primarily concerned with an automatic manipulator which may be used to perform a variety of functions which currently require human labor and to perform such functions efficiently and without hazzard to human beings. Unlike conventional industrial manipulators which are automatically controlled by signals generated from memories or by limit switches the control means for the manipulators of the instant invention includes both an automatic controller such as a programmer or computer and a remote control system which is supervised and operated by one or more persons who may either view the manipulator directly or who employ television to view one or more areas which may include the environment adjacent the manipulator, a component of the manipulator or the entire manipulator in action and part of the environment adjacent thereto. A television camera mounted on the upper portion of the manipulator, may be fixedly or movably supported thereon and directed to scan the manipulator arm or fixture, the tool or handling device supported thereon and the environment adjacent the manipulator so that an operator who views a monitor screen remote from the manipulator may either completely direct its operations in handling work or performing operations thereon or may preposition the manipulator head prior to starting an automatic control cycle in which the manipulator performs one or more operations automatically thereafter. The automatic cycle may be complete in itself to effect completion of the operation or may terminate at a point where a variable movement or operator controlled or initiated operation is required whereupon the operator may automatically or remotely control the manipulator by push button means which generate or select control signals which are transmitted to the manipulator.

The manipulator employed in the instant invention is a self-propelled, ground travelling unit having a single work seizing head supported on an extendable arm which is part of a fixture which is power driven up and down a column supported by a carriage which is track or belt driven along the ground. The carriage also supports a short wave receiver for control signals generated at a remote monitor station, a transmitter for television signals and, in certain instances, feedback signals which are representative of the operation of one or more of the manipulator components or other sensors associated with the manipulator. The carriage also includes a power supply for operating the various motors and other devices mounted on the manipulator and a program controller or computer adapted to control the operation of the manipulator either in response to signals generated by sensors on the manipulator or signals generated remotely by a person monitoring the operation of the manipulator and/or the movement or work or material adjacent thereto.

The manipulator carriage also supports a plurality of extendable fixtures or arms which are power operated to extend therefrom to support the manipulator and prevent it from tipping over when either handling heavy loads or when operating a tool disposed at the end of its arm wherein the tool in its operation on the work creates a force which may ordinarily tend to move or tilt the manipulator, if not tip it over. The extendable fixtures may fixedly retain the manipulator in place while it operates or performs part of an operation or may provide such support while the manipulator is moving along the ground. Extension and retraction of the fixtures relative to the manipulator or carriage may be both remotely controlled by an operator and automatically controlled by either the program control means or computer for controlling the operation of the manipulator or in response to signals generated by sensors which either sense movement or tipping of the manipulator during an operation or a drastic shift in the center of gravity of the manipulator due to a weight lifted or about to be lifted or the operation of a tool on work. In a particular mode of operation involving the use of such extendable fixtures or arms, command control signals may be generated by a computer which extends the supporting fixtures during a particular operation or part of a cycle in which the manipulator arm is extended while picking up a heavy weight or performing part of an operation on work, whereafter other signals are generated which retract the supporting fixtures off the ground to permit movement of the carriage or when the upsetting force is removed to permit further automatic operation of the manipulator.

In yet another form of the instant invention, a tool or head holding stand is provided which is accessible to the manipulator and which holds either or both tool heads and article seizing heads of different function, in predetermined locations thereon and automatic or remote control means are provided for enabling and effecting the change of one tool or head on the manipulator to another. Automatic tool or head release and locking means are provided to permit the automatic or remotely controlled operation of the manipulator in the act of replacing one head with another selected head in response to signals which are generated by the computer or by a person remotely monitoring the manipulator operation.

Further means are also provided wherein the television signals generated by the manipulator mounted television camera are automatically analyzed at the monitor station or by the computer at the manipulator and the results of such analysis are utilized to automatically control the manipulator or to select a particular control signal program to control the manipulator in its operation thereafter.

There is shown in FIGS. 1-4 components of an automatic article handling system which includes one or more article manipulators 10 located remote from a control monitor station 50 and operable in either of two modes of operation, one being an automatically controlled mode in which a computer generates signals for controlling the operation of the manipulator to perform functions relating to picking up, transporting, releasing or otherwise manipulating articles located within the realm of operation of the manipulator. The second function, which may be performed in conjunction with or as a supplement to the automatic control function or as a separate operation when the automatic control function is either not functioning or is incapable of being performed under the direction of a computer, comprises remote control of the manipulator by manual means generating command control signals at the monitor station which are transmitted by short wave or other suitable means to the manipulator.

The manipulator 10 comprises a base or carriage 20 having an upstanding column or guideway 11 supported thereon and supporting a television camera 30 at the upper end thereof and a turret carriage 13 which may be driven up and down the column as well as being rotated with the column on base 20. The column 11 is a hollow, tubular housing having opposed slotted openings 11S and 11S' extending substantially the vertical length of the column. Located within column 11 is an endless drive belt 36 supported between an idler pulley 35 and a driven pulley 37 which is power rotated in either direction by belt or chain drive from a reversible gear motor 39 located at or beyond the bottom of the column. The belt or chain 36 is connected to a tubular housing 15 which extends through openings 11S and 11S' and is preferably slidably engaged in said openings as part of the assembly 12 which includes the turret 13. Thus, as belt or chain 36 is driven by motor 39 in one direction, the turret assembly 12 will move either upwardly or downwardly on the column and, when the chain or belt 36 is driven in the opposite direction, the turret will move in its other direction. Thus, depending upon how motor 39 is controlled, the degree and direction of movement of the turret assembly may be varied and controlled in accordance with the control effected of motor 39.

Protruding outwardly from tubular housing 15 is a shaft 16 which is movable through said housing and is urged to project and retract an article seizing head 18 by means of a lineal motor 17 located at the rear end of housing 15. The output shaft 17S of motor 17 is connected to shaft 16 and is either driven outwardly from said motor by fluid pressure which is selectively applied thereto or other suitable power means.

The article seizing head 18 comprises motor 28 and jaw assembly 25 including jaw members 26 and 27. Motor 28 or actuator is operable to open and close the members 26 and 27 to seize and release articles in alignment therewith. Also mounted at the end of arm 16 or directly on the jaw assembly 25 is a small television camera 34 which is located to scan directly above or alongside the jaw members for close-up viewing of the phenomenon directly in front of assembly 25.

The column 11 contains a large circular bevel gear 11G secured near the end thereof, the teeth of which gear are engaged by the teeth of a small bevel gear 19S connected to the output shaft of a reversible gear motor 19 which is supported below and to the side of the column 11 on the housing 20A of the carriage 20. Thus, the entire assembly including column 11 may be selectively rotated to position the jaw assembly 25 in alignment with most any object or article located adjacent the manipulator 10 by suitably controlling the operation of motors 19, 17 and 39.

The carriage 20 contains means for supporting two separate cleated belts or tracks denoted 23A and 23B, each of which is separately power driven by a separate reversible gear motor, denoted VM1, and VM2 [not shown] which are supported on the carriage frame 24 and which are selectively remotely controllable to drive their respective belts in either direction to position the manipulator at various locations in its realm of operation. Thus, not only may the powered arrangement of FIG. 3 be utilized to drive the manipulator back and forth when both motors VM1 and VM2 are simultaneously operating in the same direction, but it may also be utilized to turn the manipulator when one motor drives its belt either without the operation of the other motor o by driving the other belt in the opposite direction, thus causing the manipulator carriage 20 to be driven in a circular path.

Suitable remotely controllable electrically braking or holding devices are preferably provided to retain each of the described movable components in position while one or more of the other components are operated. For example, a solenoid or motor 44 supported on turret 13 may have its output shaft projectible against column 11 such that when it is projected, it will hold the column in place against shifting either upwardly or downwardly during the operation of the manipulator head either in movement toward or away from the turret or in pivotal movement. The jaw assembly 25 is also pivotally mounted at the end of shaft 16 and is selectively pivoted to provide the jaws in a plurality of attitudes, by selective operation of a motor or actuator 18a located at the end of shaft 16 on the seizing head 18. The small camera 34 is preferably located such that it will swing about the pivot of the jaw assembly 25 so that it will always have its scanning axis in the direction of the jaws.

The television camera 30 at the upper end of platform 11 is preferably pivotally supported on a bracket mount 31 located on a disk-shaped platform 29 which is rotatable about the vertical axis of column 11 at the end of said column. Gear teeth 29G formed in the periphery of the platform 29 are engaged by the teeth of a spur gear 38 supported by the shaft of a reversible gear motor 46 which is supported at the upper end of column 11 for rotating platform 29 and camera 30 supported thereabove around a vertical axis. The camera 30 is pivoted about a horizontal axis by means of a lineal actuator or gear motor 32 which is supported by platform 29 and has its shaft 32S pinned to a slotted opening in a bracket 33 secured to the rear of the camera housing. Thus, by predeterminately controlling reversible gear motors 46 and 32, the scanning axis of camera 30 may be varied to permit a person monitoring the space surrounding the manipulator to view different areas thereof from a remote location such as monitor station 50 of FIG. 1 as will be described.

Lineal actuators or fluid cylinders 42 and 43 located at the front and rear of carriage 20 are operable to project their respective shafts 42S and 43S and end plate fittings 42F and 43F against the ground when it is desired to stabilize and support the manipulator, for example, when it is in the act of handling a relatively heavy load or when it desired to maintain said manipulator in place during the handling operation. The operation of actuators 42 and 43 is also preferably remotely controllable in the manner hereafter described.

A housing 20H supported by the carriage 20 preferably contains a short wave receiver for command control signals which are generated remotely such as at the monitor station 50 as will be described and, in certain instances, a recorder for said signals, logical circuitry for decoding the signals or a mini-computer operable in response to signals received from the remote monitor station for sensing signals generated by sensors such as the television cameras 30 and 34 on manipulator 10 as well as other sensors of the work, to control the manipulating operation. An antenna 45 is supported by the housing of the carriage 20 for receiving short wave signals from the monitor station and, in certain instances, for transmitting feedback signals from the sensors of the manipulator. Accordingly, there is also provided in housing 20H a radio transmitter which is coupled or connected to receive signals from the sensors of the manipulator and to transmit same by short wave to a remote location such as a receiver at the monitor station 50.

The monitor station 50 of FIG. 1 includes a control console 51 having a short wave receiver 64 including television receiving devices 65 and 66 which include respective viewing screens 65A and 66A for viewing the fields scanned respectively by television cameras 30 and 34 mounted on the manipulator. A keyboard 51S contains a plurality of control switches which, when activated by the operator of the console, generate command control signals, as will be described hereafter, which are transmitted to the receiver of the manipulator and which are operable to cause the manipulator to execute various actions in the performance of its duties. Remote manual control of the manipulator may be effected by continuously transmitting different tone signals, combinations of tone signals or repetitively transmitting digital signals in the form of codes which are operable to selectively control the various described motors for operating the different components and assemblies of the manipulator.

In FIG. 2, the manipulator 10 is shown having a sensing device 40 which includes a surface sensing transducer 41 located at the end thereof. The sensing device 40 may comprise, in its simplest form, an arm which protrudes laterally outwardly from the manipulator, preferably in one of the directions of travel and mounting a transducer such as a limit switch, photoelectric cell and relay or other form of sensor which senses a surface immediately in alignment therewith or contacted thereby and generates a signal indicative of the sensing operation which signal may be utilized to either initiate the operation of an automatic controller such as a mini-computer located on the manipulator in housing 20A or may be transmitted to the monitor station 50 and employed to effect generation of a plurality of command control signals from the memory of a computer located thereat to cause the manipulator to execute a preprogrammed cycle of operation under the control of said signals when they are received by the manipulator receiver. A work load or object W is picked up by the manipulator 10 either in a cycle which involves manual remote control or automatic control by means of a computer. In FIG. 2, a rack 47 of different seizing heads, each of which is predeterminately located thereon and is removable therefrom as a replacement for the seizing head 25 of the manipulator after the manipulator has deposited its seizing head 25 at a predetermined location on the rack 47 and has moved the end of shaft 16 into alignment with a selected seizing head which may be automatically coupled thereto as will be described.

FIG. 5 shows broad aspects of an automatic control system 49 for the manipulator 10 illustrated in FIGS. 1-4. The monitor station 50 contains the described video receivers and monitors 65, 66 which may comprise conventional short wave television receivers for receiving video signals from television cameras 30 and 34 and displaying respectively the areas surrounding the manipulator and that immediately adjacent the seizing head to an operator sitting at the control console 51. The signal generator portion of the control console 51 operates in response to manual closure of selected keys of keyboard 51S or signals generated by a computer CO which operates in response to the activation of selected keys of keyboard 51S and/or signals received by the short wave receiver 51R of the monitor station. A tone or coded relay 51T is connected to the antenna 51A via receiver 51R of the monitor station 50 and has its output connected to an input to computer CO for generating codes on said input in response to signals received as transmitted from the manipulator and generated thereat in response to one or more sensors mounted on the manipulator and operable to sense and discriminate articles or objects immediately adjacent thereto. The control signal generator 51G which generates code signals or tone signals in response to selected operation of keyboard 51S or signals generated on the output of computer CO, is connected to a short wave transmitter 51X which transmits said signals as short wave signals from its antenna 63S to a short wave receiver 53R located at the manipulator 10.

The control system 53 at the manipulator includes a plurality of control modules 54, 56 and 58, each of which has its input connected to the output 53' of short wave receiver 53R. Module 54 comprises a plurality of coded or tone responsive relays connected in parallel to the input from short wave receiver 53R. Each of the relays has an output illustrated as one of the multiple outputs 54' of the coded relay bank 54 and extending to a respective one of the controls 55C for the servos or motor 55 described which operate the various components and assemblies of the manipulator.

A bank of coded relays 56 is provided having respective outputs 56', each of which extends to a respective control for positioning and adjusting the television camera 30 in response to specific code or tone signals received by short wave receiver 53R from the monitor station 50. The camera controls 59 may thus be selectively operated either in response to signals generated by the operator selectively operating keyboard 51S or signals generated by the computer CO. These controls, as will be described hereafter, include controls for controlling pivotal movement of the camera 30 about a vertical and/or horizontal axis to permit it to scan different areas surrounding the manipulator. Further controls [not shown in FIG. 5] may also be employed and remotely controlled by respective of the coded relays 56 to control camera focus, lens opening, and other variables. Similarly, camera 34 which is mounted on or adjacent the manipulator seizing head, may also be remotely controlled to vary the scanning axis and focus thereof.

A bank of coded relays 58 is also connected to the output 53' to receive the tone or code signals generated thereon.

The outputs 58' of the relays 58 are connected to respective inputs of a control computer or programmer 57 to activate various controls thereof and effect the reproduction of different arrays of control signals generated as respective signal programs, each of which is operable to control the various motors or servos of the manipulator in such a manner as to cause the manipulator to execute respective movements to pick up, move a unit of work along a predetermined path and deposit said work unit at a selected location.

The computer 57 may also contain logic circuitry for performing various logical functions associated with the manipulator's operation under certain conditions to be described. The inputs 58' to the computer 57 may be activated upon receipt of suitable signals from the monitor station signal generator 51 to perform such functions as [a] operating switches in the computer for selectively reproducing signals which are operative to control the manipulator to move its seizing head in a particular path with respect to the manipulator to seize, transfer and release an article between two points in space which are predeterminately located with respect to each other; [b] operate control switches to effect repeat cycle operation of the same manipulation function a predetermined number of times; [c] operate control and logical switches to permit different cycle commands to be reproduced in any sequence; [d] condition the recording means of the computer to record new commands as received from the control console; [e] condition the recording means of the computer 57 to record command signals as received from signal generating means such as analog to digital converters and/or generators associated with the operation of the manipulator arm, turret, jaw and column operation as well as the operation of the carriage supporting and driving the manipulator.

Also shown in FIG. 5 is a short wave transmitter 60 mounted on the manipulator, as described, for transmitting both the video signal outputs of cameras 30 and 34 and, when applicable, the outputs of one or more sensors such as sensor 41 projecting from the manipulator jaws, arm, column, or carriage described and operable to sense a surface such as that of an object or work piece immediately adjacent the manipulator to be handled thereby.

FIG. 6 shows further details of the automatic control system illustrated in FIG. 5. The system permits the manipulator to operate in an automatic mode under the control of its own program controller or computer, or in response to signals generated from a remotely located computer which is disposed at or near the monitor station or is in communication therewith. The system of FIG. 6 also provides for the remote automatic control of the manipulator in response to signals generated by manually closing switches at the monitor station to generate selected tone or code signals which are transmitted by short wave to the manipulator's short wave receiver which signals may be utilized to effect control of either the entire operation of the manipulator or a portion of its operation in performing a particular handling function such as its movement to align its seizing head or arm assembly with an object to be manipulated thereby or otherwise performed on.

In FIG. 6 a short wave receiver 71, equivalent in function to the receiver 53R of FIG. 5, operates to receive command control signals in the form of chains of codes or tones generated by the selected operation of keyboard switches 51S of the control console of the monitor station. Receiver 53R is also adapted to receive and pass command control signals generated by the computer CO of FIG. 5, together with any keyboard switch generated signals, on a common output (not shown) which is connected to a plurality of outputs denoted 72 which extend to respective tone or code responsive relays 73 which are further denoted by letter notations TR followed by respective numerical notations, each of which relays 19 connected to control the operation of a motor, motor control or other device associated with the manipulator when it receives a specific tone or code signal to which it is responsive to the exclusion of the other relays. Thus, while all of the remotely generated control signals received by receiver 71 are passed on a common output of the receiver to all of the tone responsive relays TR, each of the relays responds only to a particular tone or code signal which causes it to generate a control pulse or a signal during the time the relay is energized. A first relay TR1 has its output connected to a control input for a constant speed motor 74M operable by a signal from coded relay TR1 to drive a magnetic recording drum 74 at a constant speed. The drum continues to be driven by motor 74M until a second signal is received by short wave from receiver 71 or is reproduced by a head 76' scanning a separate record track which signal is passed to a flip-flop switch forming part of the control for motor 74M, thereby deactivating the motor.

The recording drum 74 of the manipulator control system 70 contains a plurality of separate record tracks 74T, each of which contains a series of command control recordings interposed between gating signals which are operable to gate respective portions of the command control recordings to different controls for the different motors or servos controlling the operation of the manipulator to cause it to execute a particular operation involving the movement of the seizing head thereof to a particular location in its path of travel with respect to the support or carriage of the manipulator, seize or otherwise operate on a work piece located in alignment therewith, transport the work piece along a predetermin path to a second location by the controlled movement of the servo or motors of the manipulator which may or may not include the motors driving the carriage thereof and release the work piece held thereby or otherwise preposition or perform predetermined operations with respect to the work piece.

A second tone or coded relay TR2 is activated by signals generated on an input thereto which may originate at the monitor station 50 or may be otherwise generated as will be described, and is connected through an input 77C to pulse a stepping motor 77M which predeterminately operates a first stepping switch 77 having input thereto from one of the magnetic pick-up heads 76 which are transducers operable to reproduce from respective of the record tracks 74T of the magnetic drum 74. Depending on the number of times the stepping motor 77M is pulsed by signals applied to the input of relay TR2, a selected one of the heads 76 reproducing from a selected record track 74T, will be connected to the output of switch 77 through a bi-stable switch 77S to the input of a second rotary stepping switch 78 which is operated by a stepping motor or solenoid 79 when pulsed to selectively connect the input to one of a plurality of outputs 80 thereof which extend directly to the controls of the various motors, servos and solenoids operating the manipulator 10. The stepping motor 79 is controlled in its operation to gate selected portions of the command control recordings reproduced from the selected record track to the controls for the various devices to be controlled by said recordings by a tone relay TR23 which is connected directly to the output of rotary stepping switch 77. Accordingly, signals are recorded on each of the record tracks between the command control recordings which are operable to activate relay TR23 and step switch 78 to its next position prior to the reproduction of the next group of command control recordings from the track of drum 74 which is being transduced. The drum 74 is preferably driven at a slow enough rotational speed by motor 74M to permit each motor or servo driving a component or assembly of the manipulator to perform its function before the next group of command control recordings from the drum is reproduced.

Each of the outputs 80 of stepping switch 78 is connected to a respective motor control or control subsystem denoted by the general notation CM for the various motors or servos associated with the manipulator. Control CMR1, for example, controls a first motor MR1 and may be utilized to rotate one of the scanning television cameras such as camera 30 in the direction defined by the particular command control signals received thereby after being reproduced from a portion of a selected track of the drum 74. A second control CMR2 receives its signals from a particular output of stepping switch 78 and controls the operation of a second motor MR2 in the manner described hereafter. Motors MR1 and MR2 clearly correspond to motors 46 and 32 as shown in FIG. 3. A control CMJ for a motor MJ which may be equivalent to motor 19 or FIG. 3 operable to predeterminately pivot the seizing head of the manipulator. Controls CMJR1 and CMJR2 respectively control motors or solenoids MJR2 and MJR1 which operate each of the jaws or clamps 26 and 27 forming part of the seizing head. Controls CMMR1 and CMMR2 which are also connected to respective outputs of stepping switch 78 respectively control motors MMR1 and MMR2 which may comprise motors respectively operable to rotate arm 16 on the support therefor to vary the attitude of the seizing head and to rotate column 11 on the carriage supporting same, such as motor 19 of FIG. 3. Controls CMMY and CMM respectively control motors MMZ and MMY which may respectively cause the up and down movement of the turret assembly 12 on column 11 and the projection and retraction of arm 16 and the manipulator head held thereby with respect to the turret. Each of the described controls denoted CM is not only operably connected to a respective output of stepping switch 78 so that it may receive its particular component or group of signals reproduced from the selected track of drum 74 but is also connected to a respective tone or code operated relay denoted TR8 to TR17 which relays receive their inputs from short wave receiver 71 and are each energized by a particular tone or code signal generated at the monitor station when the operator selectively activates switches of the switch keyboard 51S in effecting a manual mode of remote control of the manipulator. Prior to effecting such manual control, the operator at the monitor station may generate a particular tone or code which he transmits to activate relay TR1 which terminates the operation of motor 74M stopping rotation of drum 74. An auxiliary relay TR1A may also be activated by a particular signal generated by selective operation of a switch of keyboard 51S for controlling motor 74M to fast-rotate drum 74 to a start location which start location is determined by a pulse signal recorded on one track of the drum and reproduced by pick-up 76'. The signals reproduced therefrom will be those initiating a cycle of control. The operator at the monitor station also generates a signal by selectively operating a switch of keyboard 51S which energizes a tone or code responsive relay TR3 which is operable to open switch 77S and retain same open until closed after the manual remote control function is terminated so that any signals which may be reproduced from a track of drum 74 during further movement of the drum such as to a home location, will not be passed through rotary switch 78 to any of the motor controls for the manipulator.

Notations CMS1 and CMS2 refer to forward and reverse drive controls for a motor MS1 which drives the mount for sensors 41 of FIG. 2 outwardly from the manipulator into sensing relationship with a surface in alignment therewith. Motor MS1 is operated by code signals generated by the operator at the monitor station and transmitted to the inputs of tone responsive relays TR18 and TR18' which are connected to controls CMS1 and CMS2.

Controls CF1 and CF2 respectively control the forward and reverse drive of a motor MF for varying the focus of television camera 30 in accordance with signals received by tone or code responsive relays TR19 and TR20 which are connected to the short wave receiver. Camera focus may also be controlled by signals reproduced from the drum 74. A control CT power energizes video camera 30. Motors MR1 and MR2 respectively control the rotation of camera 30 about vertical and horizontal axes, as provided in FIG. 3, and are respectively controlled by signals energizing tone or code relays TR8 and TR9. The close-up television camera 34 may also be remotely or automatically controlled in a like manner. Tone relays TR4 and TR4' are energized by received tones or codes generated by actuating respective keys of keyboard 51S to operate the zoom lens of focus controls CF and CF' to operate a motor for varying the focus of the camera 34 in one direction.

Also shown in FIG. 6 are controls denoted CM42 and CM42' which are operable, when activated by either respective signals generated by operation of suitable keys of keyboard 51S at the monitor station and received by the short wave receiver 71, to cause the lineal actuator 42 shown in FIG. 2 to project its shaft 42S to bring the end plate fitting 42F against the surface of the ground to the rear of the carriage 20 of the manipulator 10 for stabilizing and preventing the carriage from tipping over or moving as a result of a reaction force applied to the upper structure of the manipulator when the article seizing head or tool is operatively engaging or acting on a unit of work. While only one actuator 42 is shown in FIG. 6 as controlled by signals generated remotely by an operator at the monitor station or generated as reproduced from the memory drum 74, a number of similar actuators, such as actuator 43 of FIG. 2, which are projectable downwardly from the carriage of the manipulator, may also be provided and similarly controlled to provide extensible stabilizing devices at a number of locations around and outwardly from the manipulator carriage, depending upon the type of operation or weight being lifted by the manipulator.

Respective tone or code responsive relays TR21 and TR22 each have their inputs connected to the output of the short wave receiver 71 and are each adapted to respectively energize the controls CM42 and CM42', which when so energized respectively control the arm 42S of the actuator 42 to project the stabilizing fitting 42F against the ground and retract it therefrom. As indicated above, the actuator 43 may be similarly controlled to project its arm 43S and fitting 43F against the ground in front of the manipulator carriage 20 simultaneously as actuator 42 is operated to stabilize the manipulator both in the front and rear thereof as may two or more additional actuators project their stabilizing plates adjacent both sides of the carriage during a particular operation of the manipulator or a series of operations wherein it is not necessary to drive the manipulator carriage to affect each operation.

Also shown in FIG. 6 are means for remotely causing the rotary stepping switches 77 and 78 to attain respective home or zero positions permitting the operator at the remote location to more rapidly and easily control each to respectively effect the reproduction of communication signals from a selected track of the record drum 74 for automatically controlling the performance of a particular manipulation operation and conditioning switch 78 so that it may operate thereafter to permit the performance of the selected operation. The necessity of causing switch 78 to have its rotary arm home to a zero location by the remote control thereof may be eliminated if each command control message recorded on the drum 74 contains a signal or signals at the end thereof which, when reproduced at the end of a cycle, properly control the stepping motor 79 to step the switch rotary arm to its home location. Accordingly servo devices 77M and 79 may each comprise a stepping motor with an input from its respective tone responsive relay for stepping the switch arm thereof in one direction and a reverse drive motor connected to drive the switch arm in the reverse direction until the home location has been attained thereby. A tone or code responsive relay TR25 is responsive to a signal generated by depressing a selected switch of the keyboard 51S for generating a selected tone or code. Energization of relay TR25 generates a signal which is passed to an input through the rotary switch drive unit 77M for causing the motor thereof to drive the shaft driving the arm of switch 77 to its home location whereupon a shaft cam or pin closes a limit switch causing the motor to stop. Tone responsive relay TR 24 similarly causes rotary switch drive unit 79 to operate and drive the arm of switch 78 to home at which a limit switch is actuated by a cam or pin on a shaft thereof and stops the arm of switch 78. Other means such as electrical counters and code matching means may be provided to control switches 77 and 78 or the non-rotating electronic equivalence thereof to properly function and gate selected command messages to relay storage for controlling the manipulator as described.

A typical control circuit for one of the manipulator servos or motors MJ is shown in FIG. 7 and similar circuits may be applied to controlling any of the described manipulator motors or servos. Selected of the command control signals reproduced from a selected track of magnetic drum 74 are gated to the input of an automatic control subsystem 92 and are temporarily stored therein such as in relay storage or an integrated circuit storage network, reference being made to U.S. Pat. No. 3,412,439 for further details of such storage and control arrangement. After being so stored, the signals representative of the particular command control function are read out from storage, upon command, and are applied to automatically control the servo or motor associated therewith to drive one manipulator component or assembly along a particular path and for a predetermined distance. In FIG. 7, a particular group of command control signals is reproduced from the selected track of drum 74 when rotary stepping switch 77 is automatically remotely controlled either when the operator at the monitor station generates a selection signal or a computer located either remotely or on the manipulator senses and identifies the work piece aligned with the manipulator and generates a signal representative of the work piece which signal is applied to logical circuitry [not shown] and is utilized to operate the switch 77 to connect a transducer reproducing from a selected track of the drum with the distribution rotary switch 78.

Since the signals reproduced from each track are recorded in series, they are converted to parallel code either immediately after they are passed through rotary switch 78 or in each of the control subsystems 92 by means of a series-to-parallel converter 92D, the outputs 92D' of which are connected to the relay or core storage banks 92S which hold the command control information in storage until a feedback read-out signal is generated on an input 92K thereto after which the signals are passed to a comparator 92C which receives feedback signals generated as the controlled motor MJ operates and which comparator generates a difference or control signal on its output for controlling the controlled motor in accordance with the difference between the feedback signal and the signals passed thereto from the storage means 92S. Such a feedback, closed-loop control system is shown in greater detail in U.S. Pat. No. 3,412,431 wherein a variable potentiometer 92R is coupled to sense the rotation of the controlled motor and generates feedback signals representative of said rotation to the comparator and wherein the comparator generates difference signals which are applied to the input of the controlled motor to assure that it is controlled in accordance with the information defined by the command control signals reproduced from the selected track of magnetic drum 74.

The closed-loop control system illustrated in FIG. 7 may be applied to any or all of the motors for controlling the operation of the manipulator and the one or more television cameras supported thereby, shown in FIG. 6. If the respective portions of the command control recording reproduced from the selected track of drum 74 are each gated to respective control subsystems of the type shown in FIG. 7, the drum may be rotated to complete a revolution and stopped prior to the completion of the particular predetermined cycle of operation of the manipulator and the cycle may be repeated either automatically or in response to a signal generated at the monitor station or by the sensor of the manipulator which is applied to a control such as that applied to rotate drum 74 for one revolution and terminate the operation of the drum motor when the single revolution of the drum is completed.

It is noted that the manipulator illustrated in FIGS. 2-4 may also be operated in an automatic or remote controlled mode to change its own seizing head in accordance with the type of article or object to be seized and transported or worked on thereby. Accordingly, a rack 47 is provided within the realm of operation of the manipulator which rack contains a plurality of tools and seizing heads 49 disposed at different locations thereon. A motorized tool 48 is also located at the top of the rack which may be remotely controlled after the manipulator is predeterminately positioned relative thereto and which may operate to loosen and/or tighten one or more fasteners associated with the manipulator such as fasteners for securing and releasing the seizing head assembly at the end of arm 16. In other words, by properly automatically or remotely controlling the movement of the manipulator and its components, the seizing head assembly or other portions of the manipulator may be predeterminately aligned with the motorized tool 48 which may be operated thereafter, either in an automatic mode controlled by command control recordings or a computer, or in a mode which is controlled by signals generated by manually operating switches at the control console, to tighten, loosen or release fasteners associated with the manipulator permitting the seizing head to be released therefrom when it is thereafter engaged by a particular portion of rack 47 such that a new seizing head or tool may replace same at the end of arm 16 by proper movement of the manipulator to engage the end of arm 16 therewith. The replacement may be effected by an automatic locking device located at the end of arm 16 or by further manipulating the arm to align it with the end of tool 48 which may thereafter be automatically or remotely controlled to lock or fasten the new manipulator head in place. It is also noted that tool 48 or variations thereof may be operated to perform maintenance functions on the manipulator in accordance with signals generated either by the operator at the monitor station or a computer. It is also noted that one or more motor operated devices located on the manipulator itself may be remotely or automatically controlled to effect the securing and releasing of one or more components from the manipulator such as an article seizing head or heads located at the end of arm 16.

Figure 8:
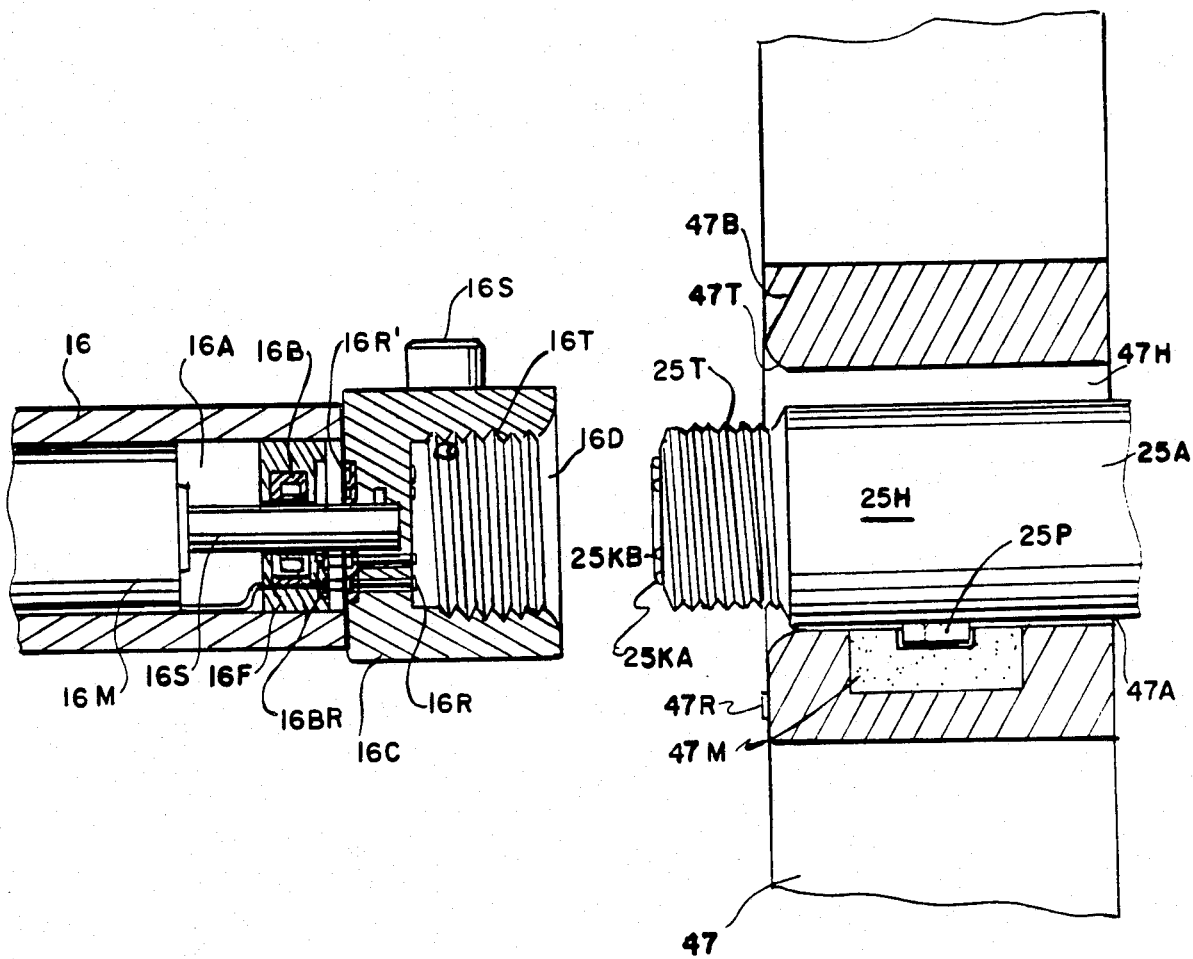
FIG. 8 is a side view with parts broken away for clarity showing part of the manipulator and storage rack illustrated in FIG. 2.

In FIG. 8 is shown further details of the coupling apparatus associated with the manipulator head for permitting the manipulator to be remotely or automatically controlled to change or replace the tool or seizing device with a new tool or seizing device. The laterally extending arm 16 of the manipulator of FIGS. 2-4 is modified in FIG. 8 and has a passageway 16A therethrough in which passageway is supported a reversible gear-motor 16M having an output shaft 16S which rotates in a tapered roller bearing 16B secured to a fitting 16F at the end of arm 16A. The shaft 16S is secured to one end of a coupling member 16C which is a cup-shaped retainer open at its outer end having the walls of the bore 16D thereof provided with threads 16T. Coupling member 16C is power rotated on shaft 16S either clockwise or counterclockwise depending on the direction in which gear-motor 16M is controlled to operate. The coupling member 16C is shown axially aligned with the exteriorly threaded end 25T of a device 25A which may comprise either a power operated tool such as a drill quill, rivet gun, spray gun, powered hammer or other tool or an article handling device such as a head mounting power operated jaws, suction cup seizing means, etc., connected to the other end of housing 25H for device 25A. Housing 25H contains, in addition to means for holding the tool or jaws of device 25A, one or more motors or solenoids for operating said device as well as the necessary wires and controls for said motors. Housing 25H also contains two or more circular contact elements 25KA and 25KB supported by the end wall of the threaded end thereof. The contacts are each connected by wires to terminals of the motors supported in housing 25H for conducting electrical energy to the one or more motors located within housing 25H such as the motor or motors associated with opening and closing jaws supported on the housing, operating a solenoid which is operable to drive jaws, open or close a valve, etc., associated with the tool or handling device located within housing 25H.

The power operated tool or powered article seizing head 25A is shown supported in a selected storage location or bay 47A of the rack 47, which storage location may be one of a number of such locations extending vertically and/or horizontally on the rack with each location adapted to temporarily retain a different tool or seizing head for the manipulator in such a manner that the head or tool is fixed in location with respect to the rack and is retained thereon to permit its threaded end to be threadably connected to the coupling member 16C of the manipulator or removed therefrom. The coupling means provided in FIG. 8, which may be varied somewhat in its construction and operation, is also operable to permit a tool or seizing head secured to the manipulator to be disposed in a selected storage bay and uncoupled from the manipulator by the proper remote or automatic control of the manipulator to align the coupling member 16C with the selected storage location whereafter motor 16M is remotely or automatically controlled as described to permit the desired coupling or uncoupling operation. In other words, when it is desired to provide a seizing head or tool at the end of the manipulator arm which may be utilized to perform a particular function which may not be performed by that tool or head which is already secured to the end of the arm, suitable operation of the manipulator may be effected to dispose the tool or head secured thereto, in a selected bay or storage location of the rack, then properly operate the manipulator and coupling means to effect uncoupling of the tool or head so disposed, then properly operate the manipulator to align the coupling means with a new selected tool or head, then properly operate the manipulator and coupling means to effect both mechanical and electrical coupling to the threaded end of the selected tool and finally, when such new coupling is effected, remotely or automatically operate the manipulator to remove its arm from the vicinity of the rack and to cause the tool head secured thereto to perform one or more programmed or remote controlled functions relative to work disposed in the realm of operation of the manipulator.

The storage bay 47A comprises a recess or horizontal opening 47H provided through a structural member or beam 47B which may be the sole vertical beam defining the rack 47 or may be one of a plurality of vertical and/or horizontal beams joined together and each containing a plurality of storage locations such as openings therethrough, each of which is adapted to receive and temporarily store a respective tool or seizing head in an attitude such as that illustrated in FIGS. 1 and 8 whereby the tool or head may be coupled to the manipulator and removed from the rack.

The opening 47H in the rack member 47B is greater in cross-sectional area than the greatest lateral cross-section of the tool 25A permitting said tool to be inserted therein and removed therefrom by the control movement of the manipulator and arm 16 thereof. Retention of housing 25H within the opening of the storage bay is effected in such a manner that it will not rotate when the coupling member 16C is power rotated against the threaded end 25T of the housing in either screw assembly or disassembly therewith. Various means may be provided for preventing the device 25A from rotating including shaping at least a portion of housing 25H to conform to a mating portion of the wall of the opening 47H. In FIG. 8, a magnet 47M is secured within a recess in the bottom portion of the wall surrounding the opening 47H. If housing 25H is made of a suitable paramagnetic material, such as tool steel, it will be attracted to magnet 47M which will hold the housing in place sufficiently to prevent its rotation during the rotation of coupling member 16C against the threaded end 25T of the housing. A protrusion or key 47P is connected to the wall surrounding opening 47H, preferably beneath housing 25H and is adapted to be inserted into a recess 25R in said housing to provide further support for the housing and prevent its rotation while the opening 47H during the coupling or uncoupling operations.

Once the manipulator 10 has been remotely or automatically controlled to axially align arm 16 with a particular tool located in a selected storage bay of the rack 47, the manipulator may be manually remotely operated, as described, or operated under computer or program control by selective reproduction of command control signals from the memory drum or tape described, to advance the coupling member 16C against the threaded end 25T of the tool and, as it further advances thereagainst, the motor 16M is properly operated to rotate the coupling member 16C in a direction to effect movement of the coupling member along the threaded end of the tool a sufficient degree to completely cause said threaded end to be completely advanced into the coupling member so that the contacts 25KA, 25KB, etc., at the end of the tool make electrical contact with respective electrical conductive rings 16R, which are insulatedly mounted against the end face of the bore 16D in the coupling member. A locking device such as a small bi-stable solenoid 16S may be secured to the outer wall of coupling member 16C and remotely or automatically operated by means of an electrical signal transmitted thereto after coupling is effected, by one of the means described, to project its actuator into a recess or hole provided in the threaded end of the tool 25A to prevent rotation thereof during the operation of the tool and to lock the tool in place. Prior to effecting an uncoupling of the tool, the retract-input circuit to the bi-stable solenoid 16S is pulsed either by a signal which is generated by a remote operator or by a signal generated by the described computer, to permit the tool to be uncoupled from the end of the manipulator arm so that it may be replaced with a new tool.

While electrical coupling means has been provided in FIG. 8 for coupling electrical energy and control circuits located in the tool or manipulator head with controls located on the manipulator, it is noted that fluidic coupling means may also be provided between the coupling member 16C, the arm 16 and the tool 25 when the tool and coupling member are connected together.

It is also noted that various other forms of coupling devices may be employed to connect or disconnect different tools or article seizing heads to the end of the manipulator arm 16 and they may include air operated actuators, electromagnetic coupling means, spring operated mechanisms which are bi-stable or mono-stable in their operation and which effect mechanical coupling when the tool and coupling device at the end of arm 16 are pushed together and disconnection when the two are properly pulled or otherwise forced apart.

The described automatically operated tool 48 may comprise, in its simplest form, an electric motor, connected to a source of electrical energy through a normally open switch which is closed temporarily by signals transmitted thereto either from the described program controller or computer mounted on the manipulator or from a tone responsive relay of the type described which responds to signals of a particular tone received by the short wave receiver of the manipulator and generated either by a remote computer or closure of a switch on the control console keyboard 51S. The output shaft of the motor driving tool 48 may comprise a screw driver or other form of coupling device which, in its simplest form, may merely rotate at constant speed. In a more complex form, the output shaft of tool 48 may be power driven by one or more control motors to vary its attitude and it may also include a manipulator, having features of the manipulator 10 or a conventional multi-axis manipulator which may position its tool in a plurality of attitudes, as well as drive the tool outwardly therefrom in a selected direction to couple to a plurality of devices associated with the manipulator 10 for tightening or loosening same to tighten, adjust or change components of the manipulator.

A number of variations may be provided in the means for effecting remote control of the described self propelled manipulator from the monitor station 50. These techniques include the following which may be used per se or as auxiliary to the means hereinbefore described:

A. One or more pivotally operated control sticks may be provided on or adjacent to the control console 51 for remotely controlling movement of the carriage 20 along the ground and the operation of the various motors or servos associated with the article manipulator apparatus described which projects upwardly from said carriage. A single "joy" stick may be gimbal mounted on the carriage and operable to activate or close different switches depending on the direction in which the stick is manipulated by hand wherein each switch connects a different tone or code signal generator with a power supply and a short wave transmitter of the type described to generate and transmit corresponding tone or code signals to the receiver of the manipulator which signals are thereafter employed, as described, to automatically control the operation of the motors driving the carriage to controllably maneuver said carriage into position with respect to work to be handled by the the manipulator and/or the article handling manipulation apparatus supported by said carriage. One or more additional control sticks may be similarly utilized to remotely control the operation of the article manipulating elements of the manipulator to position the article seizing head or jaws in alignment with a selected material or article to be handled thereafter either in response to further signals generated from the monitor station, command control signals generated by a memory or computer at the remote station or generated from a memory or computer mounted on the manipulator such as in housing 20H.

B. A pivotally operated control stick of the type described may be utilized to generate different control signals for controlling the operation of the scanners or television cameras 30 and 34 as well as motors operating focus lens control for said cameras to permit the operator to scan the area around the manipulator and the area immediately in front of the seizing head of the manipulator.

C. If a digital computer is utilized to effect either or both automatic local and remote control of the manipulator, it may receive input or feedback signals both from a device such as switches, a control stick or sticks of the type described or a light pen which is hand manipulated and made by the operator to scan or contact that area of the field scanned and displayed on the monitor screen of the monitor station to effect automatic remote control of the manipulator. Light pen signal generating means of the type provided in U.S. Pat. No. 3,346,853 may be provided to permit the operator to automatically control the manipulator by generating different signals as a result of predeterminately locating the light pen on the display screen displaying the area in front of or predeterminately disposed adjacent the manipulator and providing such signals either as code signals which are transmitted direct to the manipulator's receiver and used for controlling same or are transmitted to a computer which analyzes same and then generates control signals which are transmitted to the manipulator's receiver which utilizes same to effect automatic control of the manipulator.

A digital computer located on the manipulator as described may also receive and analyze signals generated at the monitor station as described above before generating signals for controlling the movement and operation of the manipulator.

D. The computer at the monitor station or a computer supported by the described manipulator may also receive signals generated when one or more of the described scanners scans the area adjacent the manipulator and may analyze such signals in such a manner as to provide information for properly controlling operation of the manipulator by generating suitable further controls signals which are applied to control the various manipulator servos or motors. For example, video signal analyzing means of the type provided in my copending application Ser. No. 254,710 now U.S. Pat. No. 4,118,730 issued Oct. 3, 1978 may be utilized to scan one or more of the video signals generated by either or both the television cameras 30 and 34 and generate useful information for the computer by digitizing said signals and performing computational operations on the digital signals signals so generated. The results of such computing operations may be used directly or indirectly to (a) control the manipulator elements and carriage to move towards an identified object to position the seizing head of the manipulator for picking up or otherwise operating on the object, (b) query the memory of the computer and derive therefrom a particular group of signals representative of selected stored information and capable of automatically controlling operation of the manipulator to perform a particular operation on the work or to transfer same to a selected location, (c) automatically move the manipulator into operative relationship with the object scanned where remote or further automatic control may be effected, as described, to cause the manipulator to perform a predetermined operation on the object or to predeterminately transfer same or from which position further scanning and control operations may be performed.

The automatic article manipulation apparatus hereinbefore described is subject to a number of variations with respect to its construction and the mode of controlling same. For example, while the apparatus has been illustrated as being self-propelled on a tractor-like carriage wherein control of respective cleated tractor belts in their operation is utilized to control the direction of movement of the manipulator, a variety of modifications in the construction of the self-propelled carriage which supports the manipulator and the manner in which it is controlled in back and forth movement and in steering are possible. Furthermore, it is noted that the single-column structure which is provided for supporting the manipulator seizing head and arm assembly, may be replaced by a variety of different fixtures and structures which may contain either one or a plurality of seizing head assemblies which may be separately controllable to simultaneously operate on the same or different articles to be held or operated on by tools supported thereby.

Accordingly, the following variations in the design of the manipulator and its control systems are presented as a number of the possible alternatives coming within the purview of this invention.

I. The carriage which supports the program and remote controlled manipulator or tool head assembly may be movable along a track which is fixed with respect to articles to be operated on or be manipulated thereby, such as a ground or vehicle-mounted track. Conversely, the track itself may be movable on a support either in a direction normal thereto or may be pivotally rotated by a programmed or remote control means of the type described, on a further support which is secured to the surface of the ground or comprises a movable vehicle which may also be controlled.

II. Instead of being supported by a carriage at the bottom of the tool carrying fixture or manipulator, the carriage may also be supported from overhead and may be operable to travel an overhead track such as a monorail or a birail track which is either fixed above the ground or is fixed on a vehicle or structure which is movable along the ground to permit the described manipulator or a modification thereof, to be transported to a particular site or location where the manipulator or automatic tool is to be operated.

III. The fixture which extends upwardly from or subtends downwardly of the carriage may comprise a plurality of vertically extending columns of the type described and illustrated in the drawings, each of which supports a separate article manipulator or tool head assembly which may also be of the type described or a modification thereof, for permitting the manipulator to perform a plurality of manipulating and/or assembly, inspection or machining functions relative to a plurality of articles or units of work within the realm of operation thereof. Such plural columns may be fixed with respect to the carriage or may be separately motor drivable thereon and operated either in coordination with each other or separately under remote or program control or in accordance with the teachings hereinbefore described.

The fixture which is supported by the described carriage may also comprise a frame of structural members adapted to support one or more manipulator or tool arm assemblies which may be program or remote controlled to perform a variety of operations associated with handling and/or assembly or machine operations relative to the work. These operations may include such functions as picking up and transporting different units of work to a conveyor or carrier, picking up and manipulating different units of work to predeterminately position them with respect to each other or a further assembly for the purpose of assembling said units together or to said further assembly, picking up and positioning one or more units of work and one or more fasteners for assembly operations to be performed by the manipulator, manipulating a tool such as a welding tool with respect to a unit of work which is supported by a handling device of the manipulator wherein the welding tool is also supported by another holding device thereof, simultaneously performing a plurality of operations on one or more units of work by different heads of the manipulator such as simultaneous welding operations, welding and assembly operations, drilling or other machining operations, simultaneous machining and inspection operations, simultaneous machining and fluid direction operations such as the application of a coolant, cutting fluid, blast of gas, heating means, or other device for cooperating with the tool supported by the same manipulator as it operates on the work. Such other device may include manipulating and supply devices for fasteners, welding rods, adhesives, deburring devices, inspection and finishing devices.

IV. For operations which involve the application of the manipulator or one of its handling fixtures in predeterminately dispensing a material with respect to the work such as fasteners, welding material, finishing material, coating or covering material, or other articles to be assembled automatically thereby, a supply of such material may be predeterminately located with respect to the manipulator or supported within the realm of its operation in such a manner that it is accessible to the manipulator and the manipulator may be either controlled remotely by an operator at a console by the means described or automatically under the control of a programming means such as described or a modified form thereof.

In one form of modified control system wherein an automatic manipulator of the type hereinbefore described is required to automatically travel to a source of supply of material, a homing system may be utilized wherein either the manipulator contains a source of radiation which is directed in the general vicinity of the source of supply of the material and is reflected therefrom to the manipulator and utilized to guide the manipulator towards said source of material such that it may be automatically operated or remotely controlled when at said source to obtain a new supply of such material or a radiation generating means may be located at said source of material which may generate radiation towards which the manipulator may home to bring it into operative relation therewith whereafter the manipulator may be automatically or remotely controlled to receive and replenish such material within a storage means or reservoir supported by the manipulator head or the carriage therefor. Such material to be used by the manipulator during its operation on work disposed adjacent to the manipulator may be transferred to the manipulator head through a conduit extending through the manipulator elements or may be picked up by the manipulator head when it is automatically or remotely controlled to move to the reservoir or storage means therefor and to seize or otherwise retain the material thereby.

I claim:

1. Article manipulation apparatus comprising:
    (a) a manipulator including a carriage having transport means adapted to support and guide said carriage on a ground surface,
    (b) a manipulator arm assembly supported by said carriage and including a tool head,
    (c) first power means for propelling and maneuvering said transport means across said ground surface in an infinite number of directions so as to permit the manipulator to reach different locations and to attain different positions on said surface,
    (d) second power means including a plurality of separately operable motors for operating said arm assembly,
    (e) first control means for controlling said plurality of motors to cause said arm assembly to execute various maneuvers,
    (f) said first control means including input means for receiving command control signals, and
    (g) respective closed loop control means for each of said motors connected to said input means,
    (h) program control means for generating a plurality of command control signals which are operative for controlling said plurality of motors defining said second power means for causing said arm assembly to execute a programmed maneuver,
    (i) said program control means being connected to said input means to permit the signals generated thereby to be applied to said closed loop control means for respective of said motors,
    (j) cycle initiating means for initiating operation of said program control means to cause it to generate said command control signals,
    (k) remote control means for said manipulator located at a monitor station and including a command control signal generator and a wireless signal transmitter connected to transmit signals generated by said generator by shortwave,
    (l) a wireless receiver supported by said manipulator for receiving said shortwave command control signals transmitted thereto by said transmitter, said receiver being connected for selectively controlling operation of said first power means and said motors defining said second power means in accordance with signals received from said transmitter so as to permit said carriage to be remotely controlled in its movement and to remotely control the movement of and predeterminately position said arm assembly and said carriage by applying said command control signals to said closed loop control means for respectively operating said motors, (m) a first television camera disposed on said manipulator, a second television camera disposed on said tool head and arranged to always have its scanning axis in a direction toward said tool head, motor means for driving said first television camera to scan the area in the immediate vicinity of the manipulator along a plurality of axes which are different than said scanning axis of said second television camera, and a television receiver at said monitor station for signals generated by said cameras whereby movement of said tool head can be viewed by the first and second television cameras to control said manipulator, (n) said cycle initiating means being operable when said manipulator is predeterminately located for causing said program control means to generate said command control signals and to thereby control the operation of said manipulator to execute a programmed cycle of operation.

2. An apparatus in accordance with claim 1 including means for remotely controlling said cycle initiating means to switch from remote controlled operation of said manipulator to the operation thereof under the control of said program control means.

3. An apparatus in accordance with claim 1 including video signal analyzing means for receiving signals from said first and second television cameras and transmitting signals to said remote control means for permitting the selective remote controlled operation of said first and second power means.

4. An apparatus in accordance with claim 1 wherein said cycle initiating means includes (1) means located on the manipulator for detecting the surface of an object and generating a cycle control signal and (2) means for applying said cycle control signal to cause said program control means to control the operation of said manipulator thereafter.

5. An apparatus in accordance with claim 4 including manually operable means for operating said remote control means to control the operation of said first and second power means to both vary the location of the manipulator and remotely control the operation of said manipulator arm assembly.

6. An apparatus in accordance with claim 4 including means for activating and deactivating said cycle control initiating means from said monitor station.

7. An apparatus in accordance with claim 1 wherein said program control means includes an erasable recording means for command control signals for predeterminately controlling the operation of said manipulation apparatus, said remote control means being operable for controlling operation of said recording means to selectively reproduce command control signals therefrom and to effect the recording of new command control signals therein for causing the manipulator to execute various new operations.

8. A remote controlled manipulation apparatus comprising:

(a) an article manipulator having a support including means for propelling said support across a surface, (b) a manipulation fixture supported above said support and having at least one article seizing means and power operated connection means between said seizing means and support to permit said seizing means to be variably maneuvered above said support to align it with various articles to be picked up and released by said manipulator, (c) means located at a remote station for remotely controlling said manipulator, (d) a first video scanner mounted on said support, (e) means for movably supporting said first video scanner on said support, (f) a second video scanner mounted on said article seizing means and arranged to always have its scanning axis in a direction toward said article seizing means, (g) motor means for driving said first video scanner to scan an image field adjacent said manipulator along different axes, (h) monitor means located at said remote station having a screen for viewing information scanned by said first and second video scanners and means for transmitting video signals from said first and second video scanners to said monitor means, (i) control means at said remote station for controlling said motor means for driving said first video scanner to permit the scanning axis thereof to be remotely controlled whereby a person controlling the operation of said manipulator may selectively vary the scanning axis of said first video scanner to permit him to remotely view at least a portion of the area surrounding said manipulator, (j) said second video scanner permitting said person to view along a fixed axis relative to said article seizing means, (k) whereby said person can remotely control said manipulator and article seizing means.

9. An apparatus in accordance with claim 8 wherein said first video scanner comprises a television camera and a mount for said camera disposing it above the manipulator and article seizing means, said camera being rotatable on said mount and remotely controllable to rotate in a plurality of directions.

10. An apparatus in accordance with claim 9 wherein said means for movably supporting said first video scanner includes first means for rotating said camera about a vertical first axis and second means for rotating said camera about a horizontal second axis, said remote control means for said video scanner being operable to control the rotation of said camera about said first and second axes.

11. An apparatus in accordance with claim 8 wherein said means for remotely controlling said manipulator includes a manually maneuverable transducing means which is variably positionable with respect to the screen of the monitor means permitting the transducing means to be positioned in operative relation with an image on the screen of said monitor means, means for generating a plurality of control signals which vary in accordance with the location of said transducing means, and means for applying said control signals to control the operation of the manipulator and to cause the article seizing means thereof to be directed along a path defined by the location of said transducing means when the transducing means is aligned with a particular portion of the image on the screen of said monitor means.

12. An apparatus in accordance with claim 11 wherein said transducing means comprises a manually held transducer and means for generating signals representative of the coordinates of a particular portion of the screen of said monitor means with which said manually held transducer is aligned.

13. An apparatus in accordance with claim 12 including
    means for causing said manipulator seizing means to travel in a path outwardly from the manipulator support defined by the location of said transducing means,
    sensing means located on said seizing means for sensing the surface of an article towards which said seizing means is traveling and to generate a sensing control signal upon sensing an article, and
    means responsive to said sensing control signal to slow down the movement of said seizing means to facilitate the remote control thereof thereafter in seizing the article sensed.

14. An apparatus in accordance with claim 8 including
    means supported by said manipulator for generating shape indicating signals which are representative of the shape of an article scanned, and
    a computer operable to receive said shape indicating signals and to discriminate same,
    said computer being operable depending on the shape of an article to variably control the manipulator to cause said seizing means to pick up, predeterminately transport and release said article scanned.

15. An apparatus in accordance with claim 8 including
    video signal analyzing means for receiving signals from said first and second video scanners and transmitting signals to said means for remotely controlling said manipulator.

16. Article manipulator apparatus comprising:
    (a) a monitor station;
    (b) a manipulator including a carriage having transport means adapted to support and guide said carriage on a planar surface,
    (c) a manipulator arm assembly supported by said carriage and including a tool head,
    (d) first power means for controlling and propelling said transport means across said planar surface in a plurality of directions so as to permit the manipulator to attain different positions,
    (e) second power means for operating said arm assembly to cause it to execute various maneuvers,
    (f) program control means for controlling said second power means for causing said arm assembly to repeatedly execute a program maneuver,
    (g) stationary remote control means at said monitor station, sending means for control signals generated at said monitor station and receiving means located on said manipulator for said control signals for selectively remotely controlling operation of said first and second power means to change the position of said carriage and to predeterminately position said arm assembly and said carriage prior to initiating a programmed operation of the apparatus,
    (h) a first television camera disposed on said manipulator, a second television camera disposed on said tool head and arranged to always have its scanning axis in a direction toward said tool head, motor means for driving said first television camera to scan the area in the immediate vicinity of the manipulator along a plurality of axes which are different than said scanning axis of said second television camera, and a television receiver at said monitor station for signals generated by said cameras whereby movement of said tool head can be viewed by the first and second television cameras to control said manipulator, and
    (i) cycle control initiating means operable upon predeterminately positioning said manipulator carriage for causing said program control means to control the operation of said second power means to cause said arm assembly to execute a programmed operation.

17. An apparatus in accordance with claim 16 including
    video signal analyzing means for receiving signals from said first and second television cameras and transmitting signals to said remote control means for remotely controlling operation of said first and second power means.

18. A remote controlled manipulation apparatus comprising:
    (a) an article manipulator having a support including means for propelling said support across a surface,
    (b) a manipulation fixture supported on said support and having at least one article seizing means and power operated connection means between said seizing means and support to permit said seizing means to be variably maneuvered above said support to align it with various articles to be picked up and released by said manipulator,
    (c) means located at a remote station for remotely controlling said manipulator,
    (d) a first video scanner mounted on said support,
    (e) means for movably supporting said first video scanner on said support,
    (f) a second video scanner mounted on said article seizing means and arranged to scan in the direction of said article seizing means,
    (g) motor means for driving said first video scanner to scan an image field adjacent said manipulator along different axes,
    (h) monitor means located at said remote station for viewing the image field and the article seizing means respectively scanned by said first and second video scanners and means for transmitting video signals from said first and second video scanners to said monitor means,
    (i) control means at said remote location for controlling said motor means for driving said first video scanner to permit a first scanning axis thereof to be remotely controlled whereby a person controlling the operation of said manipulator may selectively vary the first scanning axis of said first video scanner to permit him to remotely view at least a portion of the area surrounding said manipulator,
    (j) said second video scanner permitting said person to view along a second scanning axis relative to said article seizing means,
    (k) whereby said person can coordinate views along the first and second scanning axes to remotely control said manipulator and article seizing means.

19. A remote controlled manipulation apparatus comprising:
    (a) an article manipulator having a support including means for propelling said support across a surface;
    (b) article seizing means on said support and means to variably maneuver said article seizing means to align it with various articles to be picked up and released;

(c) a first video scanner mounted on said support and means for driving said first video scanner to scan an image field adjacent said manipulator along different scanning axes;

(d) a second video scanner mounted on said article seizing means and arranged to scan in a direction toward said article seizing means;

(e) means for transmitting video signals from said first and second video scanners; and (f) a remote station comprising remote control means and monitor means, (g) said remote control means being adapted to remotely control said manipulator, and (h) said means for driving said first video scanner and said monitor means being adapted to receive said video signals and display the image field and article seizing means respectively scanned by said first and second video scanners;

(i) whereby an operator at said remote station may selectively vary a scanning axis of said first video scanner to remotely control said manipulator including said article seizing means.

20. A remote control system for self-propelled vehicle containing a tool operable to perform selected operations with respect to matter adjacent said vehicle comprising:

(a) a vehicle body, (b) means for propelling said vehicle body in a plurality of directions across a surface and direction control means for controlling movement of said vehicle on said surface, (c) a tool head supported by said vehicle body and said tool supported by said tool head, (d) tool operating means for causing said tool to perform selected operations on matter and control means for said tool operating means, (e) a first television camera movably supported on said vehicle body for scanning an area adjacent said vehicle, first television camera motor means for causing said first television camera to scan areas to the front and sides of said vehicle, control means for controlling operation of said first television camera motor means, (f) a second television camera supported adjacent said tool head and operable to scan the tool supported by said head and the area immediately adjacent said tool, (g) a control and monitor station including a control console for controlling the movement and operation of said self-propelled vehicle including a control console having television receiving and monitor means for receiving and generating images of the areas scanned by said first and second television cameras, (h) first shortwave signal generating means at said monitor station for generating and transmitting first command control signals to said vehicle and shortwave receiving means supported by said vehicle for receiving said shortwave signals and passing same to said direction control means for said means propelling said vehicle body to selectively locate said vehicle on said surface, (i) second shortwave signal generating means at said monitor station for generating and transmitting to said receiving means supported by said vehicle second shortwave signals for controlling the operation of said motor means driving said first television camera, and (j) third shortwave signal generating means at said monitor station for generating third shortwave signals for controlling the operation of said tool to cause it to exercise remote controlled movements with respect to matter disposed adjacent said vehicle.

21. Automatic manipulation apparatus comprising:

(a) a manipulator including a carriage and transport means adapted to support said manipulator in movement across a surface, (b) a manipulator arm assembly supported by said carriage, (c) first power operated means for propelling and maneuvering said carriage in multiple direction free travel movement across a surface so as to permit said manipulator to reach different operative locations in the realm of its movement on said surface, (d) second power operated means including a plurality of separately operable motors connected for operating said arm assembly, (e) first motor control means for controlling the operation of said first power operated means, (f) second control means for controlling said plurality of separately operable motors to cause said arm assembly to execute various maneuvers above said carriage, (g) selectively operable control means for gating command control signals to said first and second control means, (h) program control means for generating a plurality of said command control signals for controlling said plurality of separately operable motors to cause said arm assembly to execute a programmed maneuver, (i) cycle initiating means for initiating operation of said program control means to generate said command control signals, (j) a monitor station, (k) first means at said monitor station for selectively generating first control signals for controlling the operation of said first motor control means and second means for generating a second control signal for controlling the operation of the cycle initiating means for initiating operation of said program control means, (l) said monitor station including a wireless signal transmitting means connected to shortwave transmit control signals to said manipulator, (m) wireless receiving means supported by said manipulator for receiving signals transmitted from said monitor station, (n) said selectively operable control means for gating command control signals being effective to gate said signals received by said wireless receiving means and operable for controlling the operation of said first power operated means and said separately operable motors in accordance with signals received from said transmitting means to permit said carriage to be remotely controlled in its movement across said surface and to remotely control the movement of and predeterminately position said arm assembly, (o) a pivotally supported television camera disposed on said manipulator, (p) television camera drive means for causing said camera to scan the area in the immediate vicinity of the manipulator along a plurality of axes, and (q) a television receiver at said monitor station for receiving video signals generated by said television camera whereby the movement of said manipulator may be viewed along said plurality of axes to permit a person at said television receiver to properly effect remote control of said manipulator, (r) said cycle initiating means being operable when said manipulator is predeterminately located in its realm of movement for causing said program control means to generate command control signals and to thereby control the operation of said manipulator to execute a programmed cycle of operation.

22. Automatic manipulation apparatus in accordance with claim 21 wherein said television camera drive means is operable to pivot said camera about at least one axis extending through a scanning axis of said camera.

23. Automatic manipulation apparatus in accordance with claim 21 wherein said television camera drive means is operable to pivotally drive at least part of said manipulator, said television camera being supported for pivotal movement about a vertical axis on said latter means to permit said camera to scan an area completely around said manipulator.

24. Automatic manipulation apparatus in accordance with claim 23 including an operating head supported at the end of said manipulator arm assembly, a second television camera supported for scanning the operating head and the area immediately adjacent said operating head and generating a video signal output, shortwave transmitting means for transmitting the video signal output from said second television camera, and display means at said monitor station for receiving the video signal output of said second television camera for displaying an image of the operating head of said manipulator and the area immediately in front of said operating head.

25. Automatic manipulation apparatus comprising in combination:

(a) a manipulator including a carriage, (b) a manipulator arm assembly supported by said carriage, (c) first power means for propelling said carriage in multi-direction free travel movement across a surface, (d) second power means for operating said arm assembly to cause it to execute various maneuvers, (e) an operating head supported by said arm assembly for movement along various paths defined by the maneuvers executed by said arm assembly, (f) program control means including a computer for causing said arm assembly to repeatedly execute a programmed maneuver, (g) a monitor station including remote control means for selectively remotely controlling the operation of said first and second power means respectively to change the position of said carriage and to predeterminately position said arm assembly and said operating head prior to initiating a programmed maneuver of said arm assembly, and (h) cycle control initiating means, operable from said monitor station upon remotely controlling said manipulator to be driven to a selected location, for activating said program control means to automatically cause said arm assembly to execute a programmed maneuver.

26. Automatic manipulation apparatus in accordance with claim 25 wherein said computer is also operable to control said first power means to control the movement of said manipulator across said surface.

27. Automatic manipulation apparatus in accordance with claim 25 including third power means for powering said operating head, control means for controlling said third power means connected to said computer to permit said computer to control the operation of said operating head.

28. Automatic manipulation apparatus in accordance with claim 27 wherein said operating head is also controlable in its operation by said remote control means at said monitor station.

29. Automatic manipulation apparatus in accordance with claim 25 wherein said program means includes means for selectively gating control signals generated either by said program control means or said remote control means to effect separate operation of said second power means by either said program control means or by said remote control means.

30. Automatic manipulation apparatus in accordance with claim 25 wherein said program control means includes means located on the manipulator for controlling said second power means.

31. Automatic manipulation apparatus in accordance with claim 30 wherein said program control means includes means for receiving remotely generated command control signals to establish a program for effecting operation of the manipulator.

32. Automatic manipulation apparatus in accordance with claim 31 wherein said program control means includes a recording drum having a programmable record track and means for programming said record track electrically connected to said means for receiving remotely generated command control signals.

33. A workpiece manipulation system comprising:

(a) a manipulator including a carriage with means for moving said carriage in multi-direction free travel along a surface, (b) a manipulator arm assembly including an operating head and arm assembly supported by said carriage, (c) first power means for selectively driving said carriage in multi-direction movement across a surface to permit said operating head and arm assembly to attain a multitude of operable positions, (d) second power means for selectively causing said arm assembly to execute various maneuvers, (e) said operating head including workpiece holding means supported at an outer end of said arm assembly for movement through a multitude of paths defined by the maneuvers executed by said arm assembly, (f) master control means including a computer for controlling said first and second power means to selectively drive said carriage and selectively position said arm assembly and cause said arm assembly to repeatedly execute a programmed maneuver, (g) remote control means operable for remotely controlling the operation of said first and second power means to selectively position said carriage on said surface and selectively position said arm assembly on said carriage prior to initiating an operation under the control of said master control means, and (h) gating means to selectively gate control signals generated either by said master control means or said remote control means to effect operation of said first and second power means by either said computer or by said remote control means, and (i) cycle initiating means, operable upon predeterminately locating said manipulator by said remote control means, for causing (1) said master or remote control means to initiate and effect a control cycle and (2) said gating means to gate control signals generated by either said master or remote control means to control the operation of said first and second power means.

34. A tool and article manipulation apparatus comprising:

(a) a manipulator including a carriage adapted for multi-axis free travel movement across a surface, (b) an upstanding support secured at its lower end to said carriage, (c) a manipulator arm assembly supported on said upstanding support, (d) an operating manipulator head supported on said arm assembly for movement with said arm assembly, and a power operated device secured to said operating manipulator head, (e) a first television camera supported on said upstanding support and operable for scanning an area adjacent said manipulator, (f) a second television camera supported adjacent said operating manipulator head and movable therewith for scanning at least part of said operating manipulator head and the area immediately adjacent said head, (g) first power means for propelling said carriage in movement on said surface to permit the manipulator to attain selected positions in its realm of movement, (h) second power means for operating said arm assembly to cause it to execute various maneuvers in space for selectively positioning and directing said operating manipulator head, (i) remote control means for selectively remotely controlling operation of said first and second power means to change the position of said carriage and to selectively position said arm assembly and said operating manipulator head.

35. Manipulation apparatus in accordance with claim 34 wherein
said arm assembly is movably supported on said upstanding support.

36. Manipulation apparatus in accordance with claim 34 including
means for rotationally supporting said first television camera for rotation about a vertical axis, and
reversible motor means for power rotating said first television camera about said vertical axis.

37. Manipulation apparatus in accordance with claim 36 including
means for rotationally supporting said second television camera for rotational movement adjacent said operating manipulator head to permit said second television camera to move its scanning axis with respect to said head and the area adjacent said head, and
reversible motor means for power rotating said second television camera on its support.

38. Manipulation apparatus in accordance with claim 34 including means for varying the focus of said first television camera, motor means for operating said focus varying means, and remote control means for controlling the operation of said motor means for said focus varying means.

39. Manipulation apparatus in accordance with claim 34 including
means for varying the focus of said second television camera,
motor means for operating said second camera focus varying means, and
remote control means for controlling the operation of said motor means for said second camera focus varying means.

40. Manipulation apparatus in accordance with claim 34 including
a monitor station including a command control console having video display means for displaying an image field scanned by each of said first and second television cameras, and
means operable by a person at said console for varying the attitudes of said first and second television cameras during the remote controlled operation of said manipulator to vary said image fields scanned by said television cameras.

41. Manipulation apparatus in accordance with claim 40 wherein said first and second television cameras are each pivotally mounted for rotational movement about respective vertical axes, respective reversible drive means for pivotally driving said cameras to vary the scanning axes of said cameras, and respective control means for said respective reversible drive means controlled from said command control console.

42. In a manipulator having a carriage adapted for free travel movement along a surface and reversible first motor means for driving said carriage, an upstanding support supported by said carriage and a manipulation arm assembly supported for movement on said upstanding support, reversible second motor means for driving said arm assembly on said upstanding support and an operating head including a tool supported at the end of said manipulation arm assembly, remote control means for controlling the operation of said first and second motor means and said operating head at a remote location distantly spaced from said manipulator, the improvement comprising:

(a) a first television camera supported at the upper end of said upstanding support and adapted to scan a first image field in front of said manipulator, (b) a second television camera supported by said manipulation arm assembly and adapted to scan a second image field including said operating head and an article to be operated on by said operating head, (c) receiving means for the video signals transmitted by said transmitting means including video monitor display means for displaying picture information defined by the first and second image fields scanned by said first and said second television cameras to permit a person operating said remote control means at said remote location to view an area immediately in front of said manipulator, said operating head and an area immediately in front of said operating head and to thereby properly operate said remote control means to selectively control the operation of said manipulator from said remote location.

43. In a manipulator in accordance with claim 42 wherein
said tool of said operating head is operable and remotely controllable to seize and release an article.

44. In a manipulator in accordance with claim 42 wherein
said tool is operable to perform a mechanical operation on work aligned with said operating head,
said remote control means being operable to control the operation of said tool from said remote location.

45. In a manipulator in accordance with claim 42 wherein
said remote control means includes means for generating shortwave control signals for controlling the operation of said first and second motor means, means for transmitting said shortwave control signals, and
shortwave receiving means is supported by said manipulator and includes respective control means for said first and second motor means and means for properly applying said shortwave control signals received by said shortwave receiving means to said control means to permit control of the operation of said manipulator from said remote location.

46. In a manipulator in accordance with claim 45 including
means at said remote location for controlling the operation of said first and second television cameras.

* * * * *